Oct. 1, 1957  M. S. KAPELSKI  2,808,116
FOLDING MECHANISM FOR HELICOPTER TYPE ROTOR BLADES
Filed Dec. 9, 1954  3 Sheets-Sheet 2
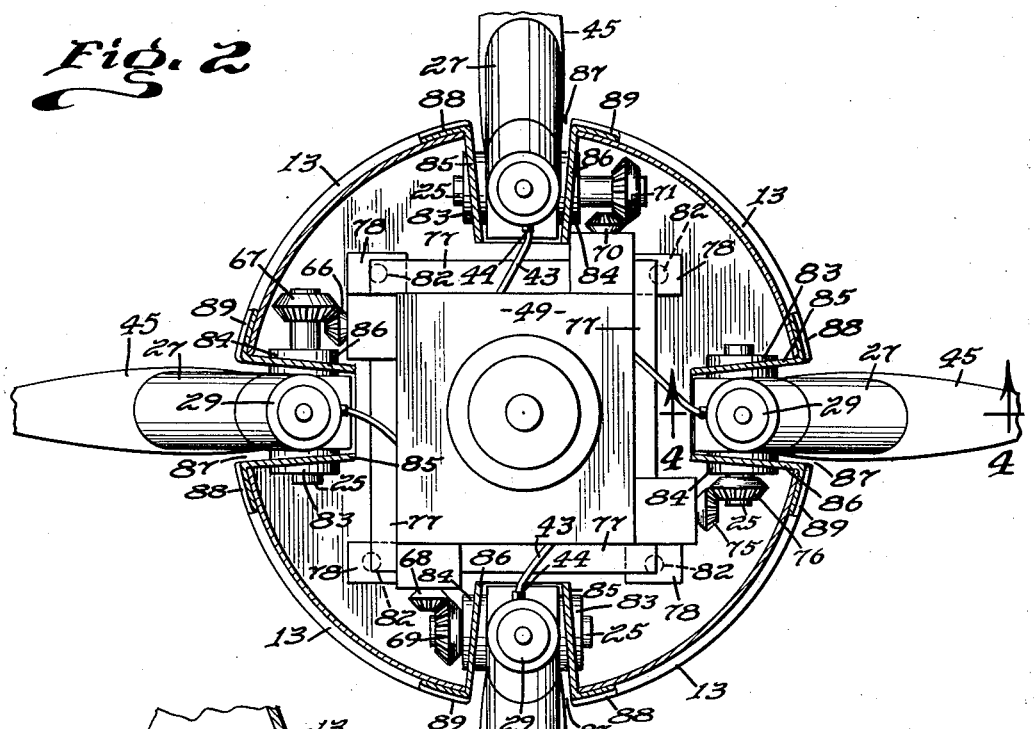
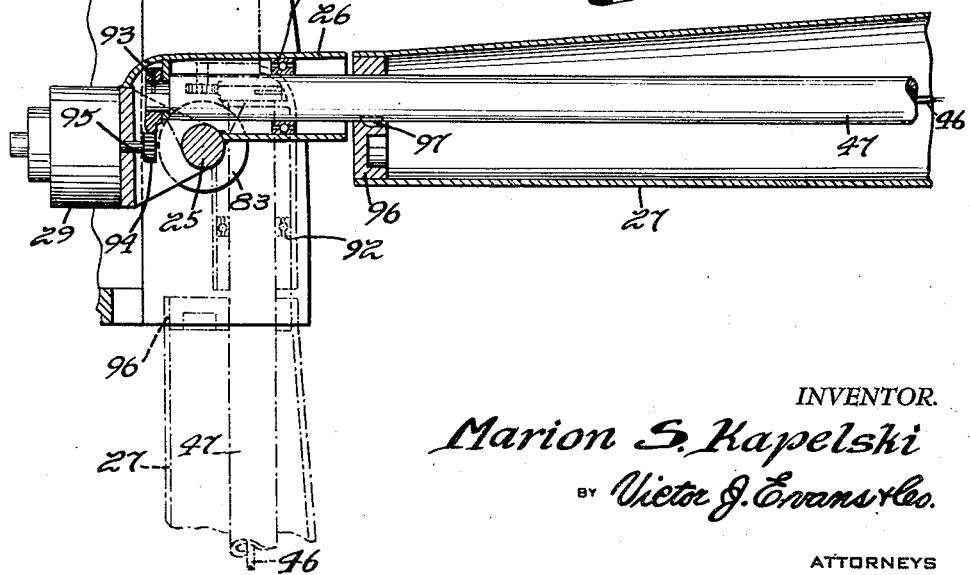
INVENTOR.
Marion S. Kapelski
BY Victor J. Evans & Co.
ATTORNEYS

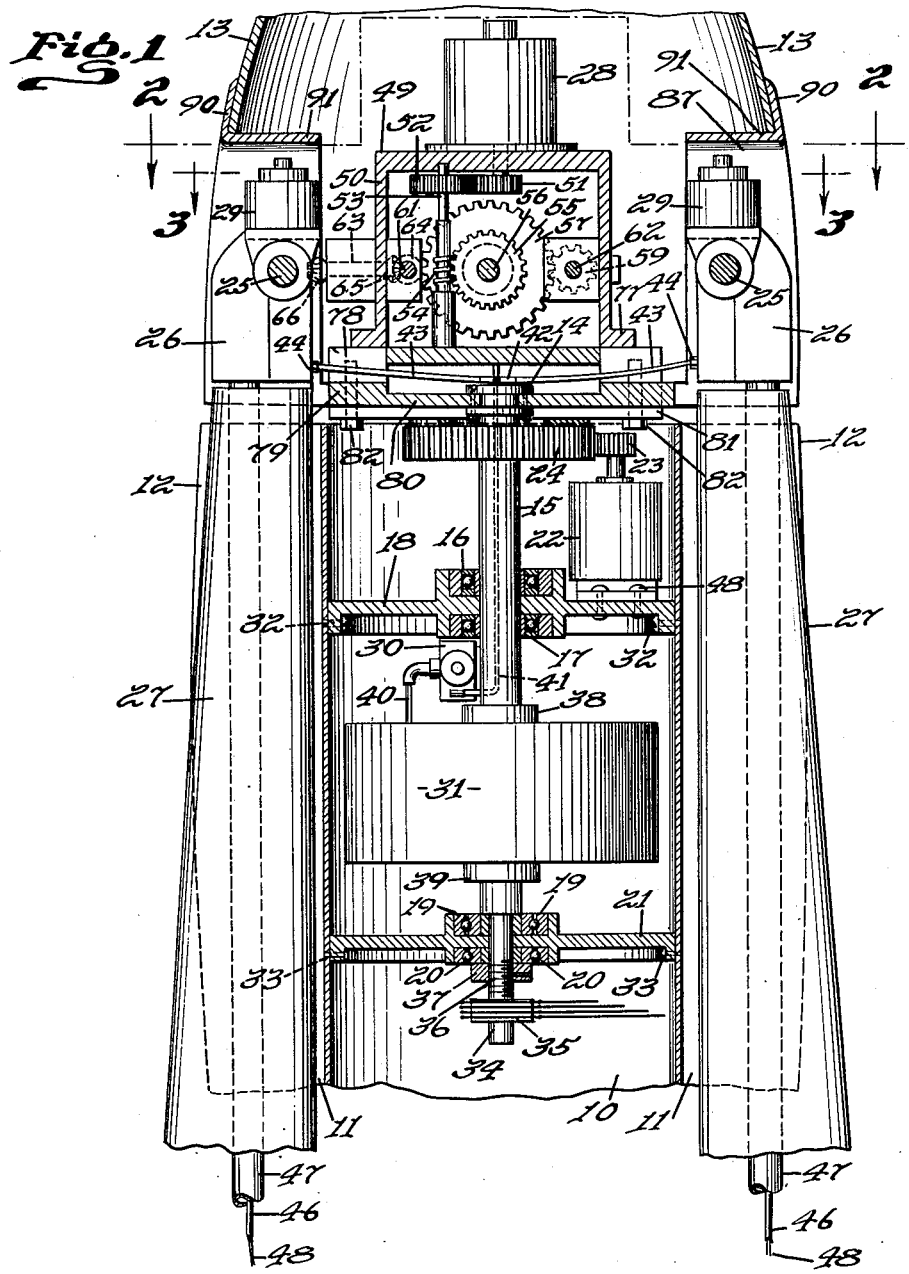

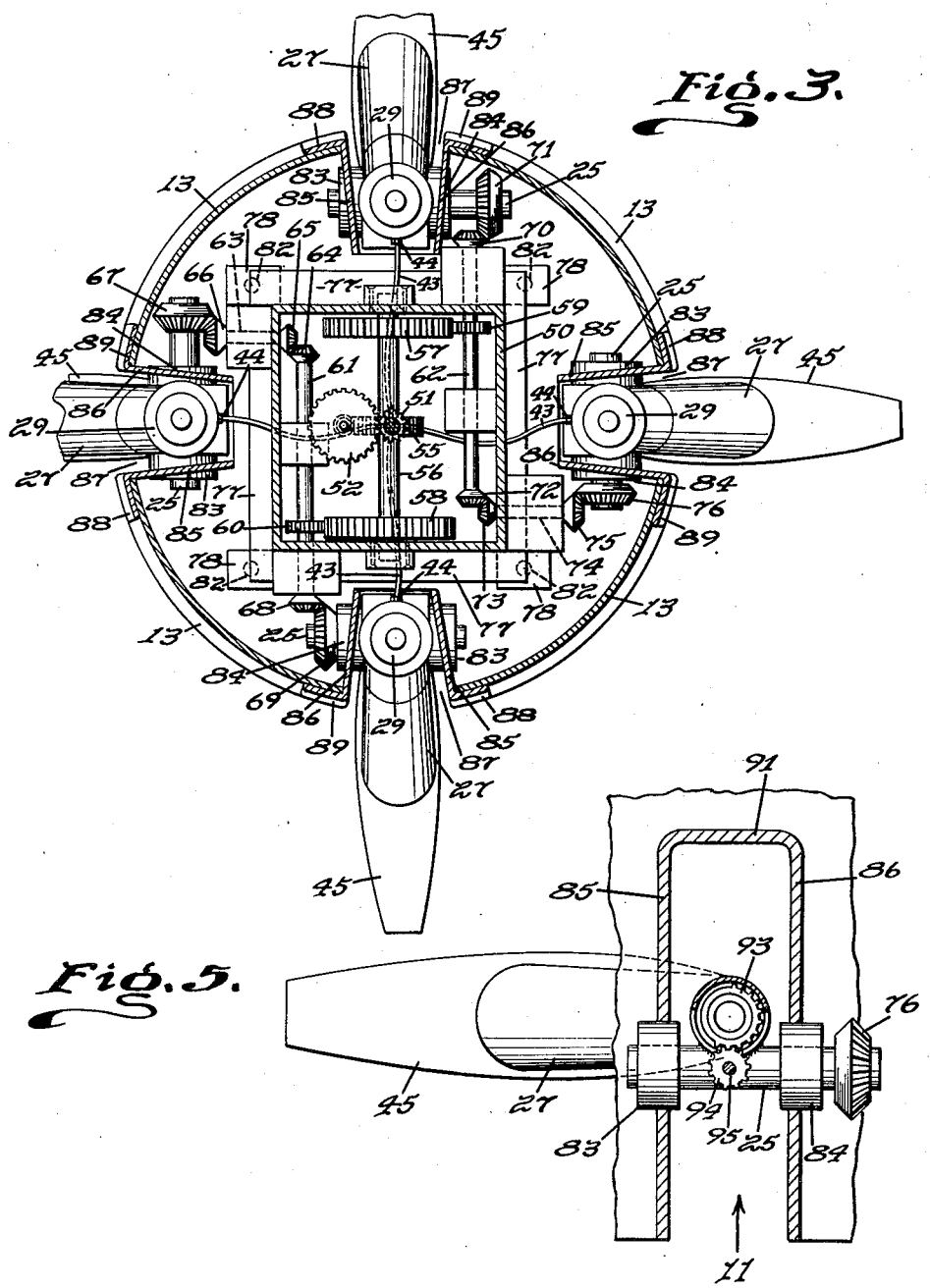

United States Patent Office 2,808,116
Patented Oct. 1, 1957

2,808,116

FOLDING MECHANISM FOR HELICOPTER TYPE ROTOR BLADES

Marion Stanley Kapelski, Philadelphia, Pa.

Application December 9, 1954, Serial No. 474,187

7 Claims. (Cl. 170—135.4)

This invention relates to aircraft of the vertical take-off or helicopter type and wherein helicopter type rotor blades are used in combination with aircraft having wing power plants, such as convertiplanes, and in particular, a folding mechanism wherein rotor blades having jets in tips thereof are adapted to be folded into longitudinally disposed recesses in a fuselgae and wherein the parts are adapted to be actuated by electric motors through transmission gear assemblies.

The purpose of this invention is to increase the efficiency of aircraft having vertical take-off instrumentalities in combination therewith by providing means for folding blades of the vertical take-off elements into recesses of a fuselage when the operation of the aircraft is taken over by the wing motors or power plants.

Conventional convertiplanes or helicopters use contra-rotating propellers and, consequently, the airships are handicapped by a limited forward speed and also by limited overall weight. Conventional helicopters are also limited in forward speed because the retreating rotor blade equals or exceeds the forward speed of the helicopter causing the rotor blade to stall, losing lift and resulting in a waste in power. With this thought in mind, this invention contemplates means for folding helicopter type rotor blades such as used on convertiplanes and vertical take-off aircraft whereby, after attaining a desired elevation, the blades are folded into recesses or pockets in the fuselage or housing and wherein means is provided for adjusting the pitch of the blades and also for rotating the blades in starting.

The object of this invention is, therefore, to provide means for mounting helicopter or vertical lift blades on aircraft whereby the blades are adapted to be extended in taking off and landing and nested in recesses in the fuselage for horizontal traveling of the aircraft or for storage.

Another object of the invention is to provide means for supplying fuel and ignition means to propelling elements, such as jets, in tips of folding blades such as blades of a helicopter or the like.

Another object of the invention is to provide folding mechanism for rotor blades of the type used for helicopters and vertical take-off aircraft in which the blades are actuated from nested positions in pockets of a fuselage to extended positions for use with operating instrumentalities incorporated in a section of a fuselage upon which the blades are mounted.

A further object of the invention is to provide means in a folding mechanism for blades of aircraft of the helicopter type in which means is provided for adjusting the pitch of the blades to facilitate nesting and also to provide efficient operation.

A still further object of the invention is to provide a mounting for blades of helicopters, vertical lift aircraft, and the like in which the blades are adapted to be extended for use and also adapted to be nested in elongated pockets in sides of a fuselage or housing in which the mechanism is of comparatively simple and economical construction.

With these and other objects and advantages in view, the invention embodies an elongated tubular housing having spaced longitudinally disposed recesses in a side wall thereof, blades having tubular supporting shafts with fuel tubes and ignition wires extended therethrough pivotally mounted in the recesses, motor actuated transmission gears for actuating the blades to extended and also to nested positions, driving means for rotating a tip of a fuselage in which the blades are pivotally mounted, a fuel reservoir and a pump for supplying fuel to propulsion elements, such as jets, on the ends of the blades, and means for adjusting the pitch of the blades.

Other features and advantages of the invention will appear from the following description taken in connection with the drawings, wherein:

Figure 1 is a vertical longitudinal section through the tip of a fuselage or housing in which helicopter blades are pivotally mounted, the blades being illustrated in nested positions in recesses of the fuselage and parts of the fuselage and blades being broken away.

Figure 2 is a sectional plan through the tip of the fuselage taken on line 2—2 of Figure 1 showing jets on ends of the blades.

Figure 3 is a cross section through the tip of the fuselage taken on line 3—3 of Figure 1 and also showing the jets on the ends of the blades.

Figure 4 is a vertical section taken on line 4—4 of Figure 2 showing a blade mounting at one side of the fuselage with other parts broken away and showing the blade in the nested position in broken lines and in an extended position in full lines.

Figure 5 is a vertical section through a blade mounting showing the gear assembly for adjusting the pitch of the blade, and also showing a jet on the extended end of the blade.

Referring now to the drawings, wherein like reference characters denote corresponding parts, the folding mechanism for rotor blades of this invention includes a fuselage 10 having blade receiving recesses 11 in an outer wall 12, a nose or tip 13 rotatably mounted with a collar 14 on a shaft 15 rotatably mounted in bearings 16 and 17 in a horizontally disposed partition 18 in the fuselage 10 and also in bearings 19 and 20 in a partition 21, also of the fuselage, a motor 22 for rotating the tubular shaft 15 and tip 13 through a pinion 23 and a gear 24, shafts 25 upon which supporting sleeves 26 of the blades 27 are mounted, a motor 28 for folding and extending the blades through suitable gear assemblies, motors 29 for adjusting the pitch of the blades, a fuel pump 30, and a fuel storage tank 31.

The transversely disposed partitions 18 and 21 are secured in the fuselage 10 with bolts 32 and 33, respectively, and these bolts are adapted to be removed to remove the blade mounting assembly from the end of the fuselage.

The shaft 15 is tubular and the lower end 34 is provided with collector rings 35 for carrying current to the motors from generators or batteries of the aircraft and the portion of the shaft 34 above the collector rings is threaded as shown at the point 36 to provide mounting means for a set collar 37 that coacts with the thrust bearing 20.

The fuel tank 31 is positioned between collars 38 and 39 on the shaft 15, however, it will be understood that the fuel tank may be provided as a separate unit and positioned in the main body of the airplane with rotary fluid seal devices connecting the fuel line from the tank through the main drive shaft.

In the design shown, a suction pipe 40 extends from the fuel pump 30 into the lower part of the fuel tank and a discharge tube 41 extends from the pump upwardly through the shaft 15 to a branch connection 42 from which flexible connections 43 extend to fittings 44 on supporting sleeves 26 of the blades, the fittings 44 being connected to jets 45 or the like at the ends of the blades through tubes 46 which extend through tubular shafts 47 of the blades 27.

The blades are also provided with ignition wires 48 that also extend to the jets or the like at the ends of the blades.

The motor 22 is secured to the partition 18 with bolts, rivets, or the like, and with the motor 22 operating, the pinion 23, meshing with the gear 24, rotates the shaft 15 and tip 13 whereby, with the blades extended, as shown in the full lines in Figure 4, the blades may be rotated for starting. As soon as the jets or other propulsion elements attain lift or flight, the circuit to the motor 22 is broken and upon the blades 27 becoming stationary current is supplied to the motor 28 to actuate the blades to nested positions in the recesses 11.

The motor 28 is mounted on an end panel 49 of a casing 50 and a pinion 51 on the motor shaft, meshing with a gear 52, rotates a shaft 53 whereby a worm 54, meshing with a worm gear 55, rotates a shaft 56, rotatably mounted in the casing 50 and gears 57 and 58 on the shaft 56 and meshing with pinions 59 and 60 on counter-shafts 61 and 62 rotate the counter-shafts with each shaft actuating a pair of blades.

The shaft 61 drives a stub shaft 63 through bevel gears 64 and 65 and a gear 66 on the extended end of the stub shaft 63 meshes with a gear 67 on the shaft 25 of the supporting sleeve of one of the blades 27.

A bevel gear 68 on the opposite end of the counter-shaft 61 meshes with a bevel gear 69 on the shaft 25 of another of the blades 27, and a bevel gear 70 on the shaft 62 meshes with a bevel gear 71 on the shaft 25 of a blade 27 on the opposite side of the fuselage.

The opposite end of the shaft 62 is provided with a bevel gear 72 that meshes with a bevel gear 73 on a stub shaft 74 and the opposite end of the stub shaft 74 is provided with a bevel gear 75 that meshes with a bevel gear 76 on the shaft 25 of another of the blades 27.

By this means operation of the motor 28 rotates the shaft 56 and gears 57 and 58 whereby the blades 27 are extended for use, or contracted to nested positions in the recesses 11, simultaneously.

The shafts of the transmission assembly are mounted in suitable bearings in the casing 50 and a continuous flange 77 on the lower end of the casing is secured to spacing blocks 78 or the like on raised portions 79 of a plate 80 in which the collar 14 is mounted, and the plate 80, blocks 78, and a frame 81 are secured together with bolts 82, as shown in Figure 1.

The shafts 25 with which the blades are pivotally mounted in the tip 13 at the end of the fuselage are rotatably mounted in bearings 83 and 84 in side walls 85 and 86 of pockets or recesses 87 in the sides of the tip 13, the recesses 87 being adapted to be aligned with the recesses 11 of the fuselage 10. The outer ends of the walls 85 and 86 are provided with flanges 88 and 89 and the upper ends of the pockets are provided with similar flanges 90 which extend from an end wall 91.

The ends of the tubular shafts 47 of the blades are rotatably mounted with bearings, such as bearings 92 in the supporting sleeves 26 of the blades and the ends of the shafts are provided with gear segments 93 that mesh with pinions 94 on shafts 95 extended from the motors 29. By this means operation of the motors 29 causes the pinions 94 to rotate the gear segments 93 and shafts 47 for adjusting the pitch of the blades.

The inner ends of the blades 27 are mounted on the shaft 47 with discs 96 and the discs and blades are secured in position upon the shafts 47 with keys 97, as shown in Figure 4.

With the parts assembled as disclosed and described, the blades 27 are nested in the recesses or pockets 11 with the aircraft in a stationary position and upon supplying current to the motor 28 the blades are extended to positions substantially perpendicular to the axis of the fuselage or body 10 and upon supplying fuel and ignition to the jets 45, such as pulse-jets, ram-jets, pressure-jets or rockets at the tips of the blades, and with current supplied to the motor 22 for rotating the head or tip 13 with the blades extended until the tip speed is sufficiently high to start the reactions that result from rotation of the tip. At this time the speed of the tip exceeds that of the motor and the circuit to the motor may be broken.

Upon reaching a desired elevation the motors 29 are actuated to adjust the pitch of the rotor blades 27 to the fully feathered position at which time the fuel and ignition to the jets 45 are shut off since the plane is operating on wing power plants. With the blades feathered and stationary the motor 22 may be used to align the recesses 87 with the recesses 11 as the blades are adapted to be actuated by the motor 28 to move into the recesses of the tip and fuselage.

Upon reversing the action of the parts, the blades are adapted to be extended for landing when a vertical landing is desired.

It will be understood that modifications, within the scope of the appended claims, may be made in the design and arrangement of the parts without departing from the spirit of the invention.

What is claimed is:

1. A rotor blade assembly comprising a housing having spaced radially disposed longitudinally positioned blade receiving recesses in a peripheral surface, a blade mounting tip rotatably mounted on the end of the housing, blades pivotally mounted in the tip and adapted to nest in said recesses of the housing, means for actuating the blades, selectively, to extended positions and also to positions nested in said recesses, individual motors carried by the blades for adjusting the pitch of the blades, and means for rotating the tip with the blades in extended positions.

2. A rotor blade assembly comprising a housing having spaced radially disposed longitudinally positioned blade receiving recesses in the peripheral surface, a blade mounting tip rotatably mounted on the end of the housing, blades pivotally mounted in the tip and adapted to nest in said recesses of the housing, means for actuating the blades, selectively, to extended positions and also to positions nested in said recesses, means for rotating the tip with the blades in extended positions, means for carrying current for ignition through the blades, and individual motors carried by the blades for adjusting the pitch of the blades.

3. A rotor blade assembly comprising a housing having spaced radially disposed longitudinally positioned blade receiving recesses in the peripheral surface, a blade mounting tip rotatably mounted on the end of the housing, blades pivotally mounted in the tip and adapted to nest in said recesses of the housing, means for actuating the blades, selectively, to extended positions and also to positions nested in said recesses, individual motors carried by the blades for adjusting the pitch of the blades, means for rotating the tip with the blades in extended positions, and fuel and ignition supplying means extended through the blades.

4. In a mounting assembly for blades of the helicopter or vertical lift type, the combination which comprises a fuselage having spaced longitudinally disposed blade receiving recesses extended inwardly from the peripheral surface, a tip having spaced pockets extended inwardly from the peripheral surface, said pockets being adapted to be aligned with the recesses of the fuselage, blades having supporting sleeves positioned with the supporting sleeves pivotally mounted in the pockets of the tip and with the blades adapted to extend into the recesses of the fuselage, a motor actuated gear assembly mounted in the tip and operatively connected to the supporting sleeves of the blades for, selectively, extending the blades to positions substantially perpendicular to the axis of the fuselage and tip or to positions nested in the recesses of the fuselage, individual motors carried by the blades, means for turning the blades by the motors to adjust the pitch of the blades and means mounted in the fuselage for rotating the tip with the blades in extended positions.

5. In a mounting assembly for blades of the helicopter or vertical lift type, the combination which comprises a fuselage having spaced longitudinally disposed blade receiving recesses extended inwardly from the peripheral surface, a tip having spaced pockets extended inwardly from the peripheral surface, said pockets being adapted to be aligned with the recesses of the fuselage, blades having supporting sleeves positioned with the supporting sleeves pivotally mounted in the pockets of the tip and with the blades adapted to extend into the recesses of the fuselage, a motor actuated gear assembly mounted in the tip and operatively connected to the supporting sleeves of the blades for, selectively, extending the blades to positions substantially perpendicular to the axis of the fuselage and tip or to positions nested in the recesses of the fuselage, individual motors carried by the supporting sleeves of the blades and operatively connected to the blades for adjusting the pitch of the blades, and means mounted in the fuselage for rotating the tip with the blades in extended positions.

6. In a mounting assembly for blades of the helicopter or vertical lift type, the combination which comprises a fuselage having spaced longitudinally disposed blade receiving recesses extended inwardly from the peripheral surface, a tip having spaced pockets extended inwardly from the peripheral surface, said pockets being adapted to be aligned with the recesses of the fuselage, blades having supporting sleeves positioned with the supporting sleeves pivotally mounted in the pockets of the tip and with the blades adapted to extend into the recesses of the fuselage, a motor actuated gear assembly mounted in the tip and operatively connected to the supporting sleeves of the blades for, selectively, extending the blades to positions substantially perpendicular to the axis of the fuselage and tip or to positions nested in the recesses of the fuselage, means mounted in the fuselage for rotating the tip with the blades in extended positions, and individual motors carried by the supporting sleeves of the blades for adjusting the pitch of the blades.

7. In a mounting assembly for blades of the helicopter or vertical lift type, the combination which comprises a fuselage having spaced longitudinally disposed blade receiving recesses extended inwardly from the peripheral surface, a tip having spaced pockets extended inwardly from the peripheral surface, said pockets being adapted to be aligned with the recesses of the fuselage, blades having supporting sleeves positioned with the supporting sleeves pivotally mounted in the pockets of the tip and with the blades adapted to extend into the recesses of the fuselage, a motor actuated gear assembly mounted in the tip and operatively connected to the supporting sleeves of the blades for, selectively, extending the blades to positions substantially perpendicular to the axis of the fuselage and tip or to positions nested in the recesses of the fuselage, means mounted in the fuselage for rotating the tip with the blades in extended positions, and motors mounted on said sleeves of the blades for adjusting the pitch of the blades.

References Cited in the file of this patent

UNITED STATES PATENTS

| | | |
|---|---|---|
| 2,472,917 | Nicolaeff | June 14, 1949 |
| 2,498,140 | Stalker | Feb. 21, 1950 |